United States Patent Office 2,730,739
Patented Jan. 17, 1956

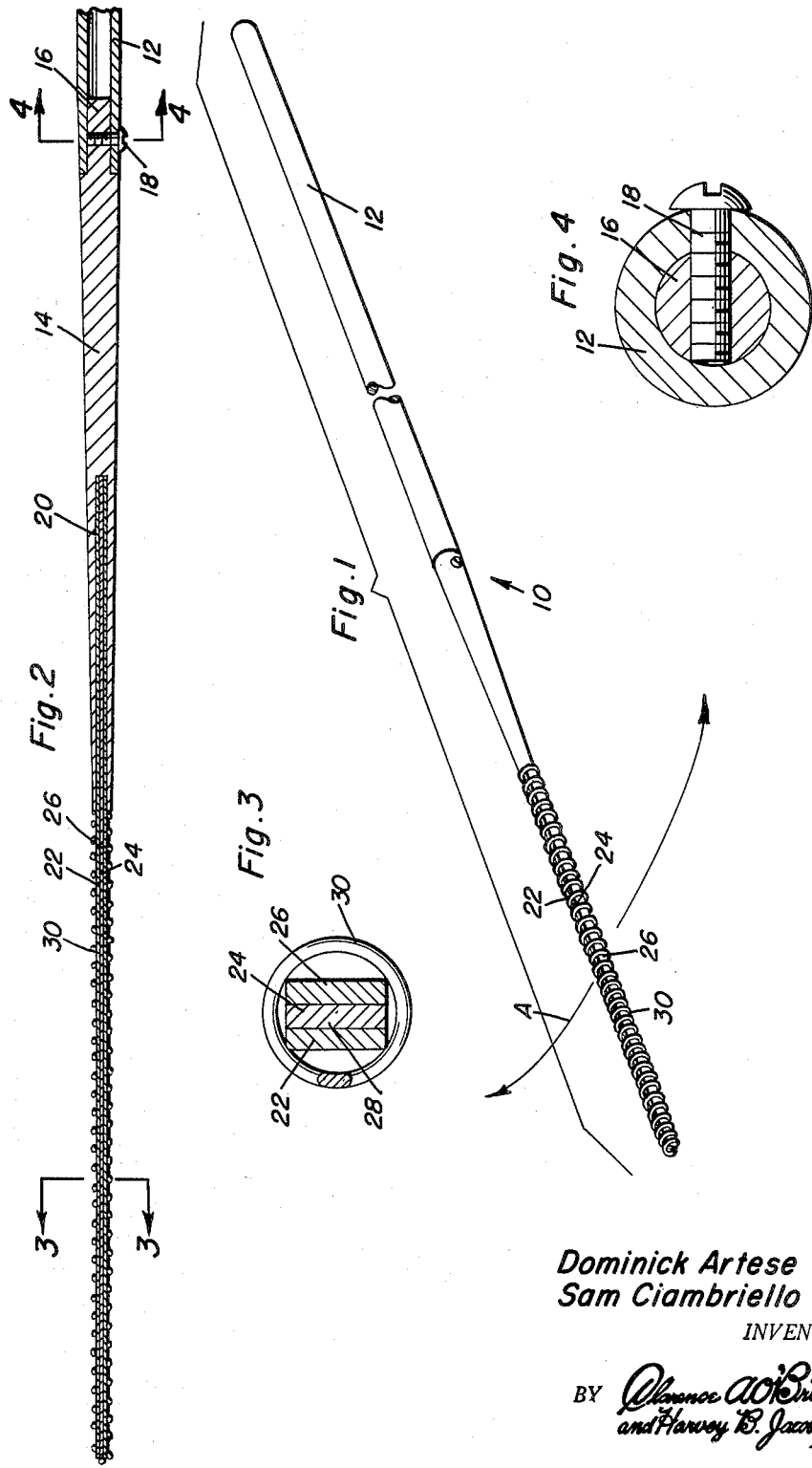

2,730,739

SWEEPER

Dominick Artese, New Rochelle, and Sam Ciambriello, Tuckahoe, N. Y.

Application June 21, 1954, Serial No. 438,005

1 Claim. (Cl. 15—104)

This invention relates generally to agricultural equipment and more particularly to a novel sweeper for use in the care and maintenance of golf greens or other fine lawns.

The primary object of this invention resides in the provision of a garden implement which is adapted for use in the care and maintenance of the greens of golf courses and the like in a convenient manner.

As is well known, greens of golf courses require considerable maintenance in the removal of foreign material such as leaves and other debris from the surface of the green so as to maintain the green in an optimum condition so that a putted ball can be expected to roll in a true course. The removal of the debris and leaves from the green should be done with a minimum of disturbance to the grass of the green and therefore, a sweeper or like instrument is usually realized. This sweeper is usually moved back and forth across the green so as to move the foreign matter on the green out of engagement with the grass on which it may have originally came to rest so that it may thereafter be removed more easily.

The sweeper comprising the present invention employs a novel arrangement of parts including a plurality of resilient strips of metal which have a coil spring coextensive therewith holding the strips together so that the strips may be flexed in one direction but are rigid in a direction normal to the first direction so that minor movement of the handle will cause the flexible strips to gently whip the debris and the like from the surface of the green. Further, the path of the movement of the strips will be easily controlled due to the fact that they may flex in only one direction.

Still further objects and features of this invention reside in the provision of a sweeper that is strong and durable, simple in construction and manufacture, capable of being made in various sizes and out of various readily available materials, yet which is inexpensive to construct thereby permitting wide distribution.

These, together with the various ancillary objects and features of the invention which will become apparent as the following description proceeds, are attained by this sweeper, a preferred embodiment of which has been illustrated in the accompanying drawings, by way of example only, wherein:

Figure 1 is a perspective view of the sweeper comprising the present invention;

Figure 2 is a longitudinal sectional detail view of the sweeper;

Figure 3 is an enlarged vertical sectional view as taken along the plane of line 3—3 in Figure 2; and Figure 4 is an enlarged vertical sectional view as taken along the plane of line 4—4 in Figure 2.

With continuing reference to the accompanying drawings wherein like reference numerals designate similar parts throughout the various views, reference numeral 10 generally designates the sweeper comprising the present invention. The sweeper 10 may include an elongated handle 12 which carries a socket portion 14. The socket portion 14 has an end 16 received within the tubular handle 12 and which is held in place by means of a screw 18 or other suitable means. The socket member 14 has an elongated recess 20 therein.

Received within the elongated recess 20 in the socket member 14 are a plurality of strips 22, 24 and 26 which are preferably constructed from a suitable resilient material such as steel or the like and which are of generally rectangular cross sectional shape so that when the strips 22, 24 and 26 are arranged with their widest faces as at 28 in abutting relationship the clips may be flexed in the direction generally designated at A in Figure 1 but cannot be readily flexed in a direction normal thereto.

Coiled about the strips 22, 24, and 26 is a coil spring 30 which holds the strips 22, 24 and 26 in abutting relationship yet which permits the strips to flex in the direction A. Further, the individual coils of the coil springs form means for resiliently engaging any of the debris which may have fallen on the grass green.

In use, utilizing the handle 12 and wiggling it slightly it is possible to start the strips 22, 24 and 26 oscillating in the direction A so that when the strips come in contact with any debris such as leaves, grass clippings and the like the debris will be lifted off the grass so that it may be more easily removed without any damage to the grass.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A sweeper comprising an elongated handle, a socket member affixed to said handle, a plurality of elongated strips of resilient material, one end of each of said strips being secured in said socket member, a coil spring coextensive with the portions of said strips extending outwardly of said socket member secured about said strips and terminating at the outer ends of said strips, said strips being equal in length and being rectangular in cross section, said strips being arranged in abutting relationship so that said strips may flex in a first direction with said strips being relatively rigid in a direction normal to said first direction.

References Cited in the file of this patent

UNITED STATES PATENTS

| | | |
|---|---|---|
| 1,748,354 | Laing | Feb. 25, 1930 |
| 1,984,644 | Holm | Dec. 18, 1934 |
| 2,538,338 | Sturdevant | Jan. 16, 1951 |

FOREIGN PATENTS

| | | |
|---|---|---|
| 585,009 | Great Britain | Jan. 28, 1947 |